3,130,989
CONNECTING ROD AND PIVOT PIN
CONNECTION
Robert J. Lannen, Detroit, Mich., assignor to Micro-Poise Engineering and Sales Company, Detroit, Mich., a partnership
Filed Nov. 15, 1961, Ser. No. 152,438
3 Claims. (Cl. 287—52)

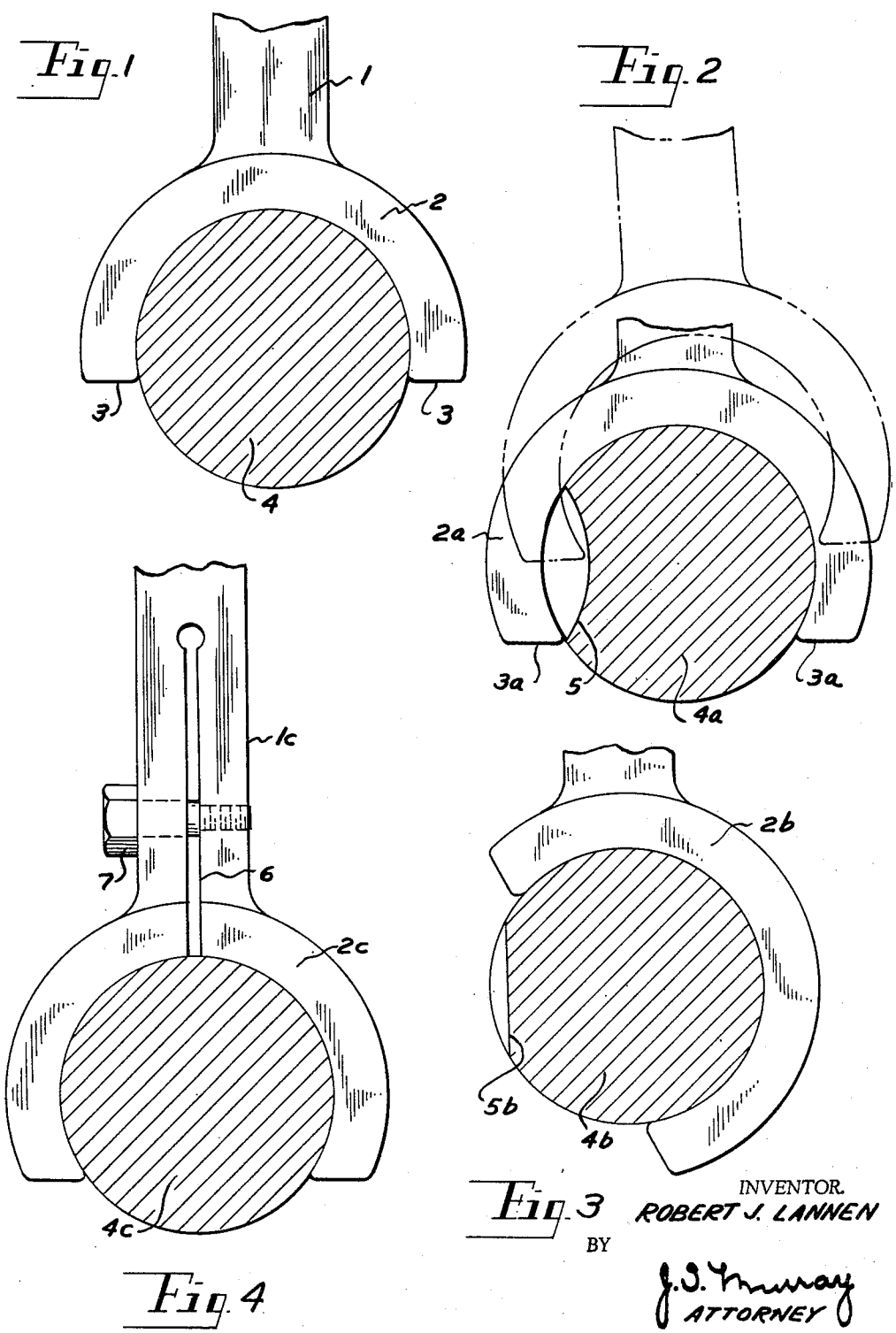

This invention relates to connecting rod and pivot pin connections and particularly to pivotal joints between connecting rods and crank throws.

An object of the invention is to expedite and simplify the interconnection of a connecting rod and crank throw or other pivot pin, which drives or is driven by said rod.

Another object is to terminally form a connecting rod with a bearing having a predetermined resiliency and having a gap proportioned to admit a pivot pin to the bearing through such gap, thus momentarily resiliently expanding the bearing, and the pin being retained in the bearing by an eventual contraction of the bearing to its original diameter.

Another object is to form the pivot pin with a peripheral notch accommodating an end portion of said gap as the pin is inserted in the bearing, whereby the necessary circumferential extent of the gap may be reduced and the retention afforded the inserted pin may be increased.

Another object is to form the connecting rod with a slot at its longitudinal axis, and to bisect the bearing by such slot so that the slot as well as the bearing gap will contribute to resilient expansion and contraction of the bearing.

These and various other objects are attained by the construction hereinafter described and illustrated in the accompanying drawing wherein:

FIG. 1 is a cross-sectional view of a crank-throw received in a bearing having a gap to admit said throw.

FIG. 2 is a similar view showing the crank throw notched to afford a reduction in the extent of the gap necessary to admit the pin to the bearing.

FIG. 3 is a similar view showing a modified location of the gap with respect to the axis of the rod and showing a different type of notch formed in the pin.

FIG. 4 is a cross sectional view, showing the connecting rod and bearing bisected by a slot to increase such resilient play as affords expansion and contraction of the bearing.

Referring now in greater detail to FIG. 1, a connecting rod 1 is terminally formed with a bearing 2 having a circumferential gap forming spaced ends 3, such gap permitting a crank throw 4 to be inserted in the bearing along the extended axis of the rod, the gap being centered at such axis. The gap is predeterminedly less in circumferential extent than the diameter of the throw 4 and the bearing 2 has a predetermined slight resiliency whereby there will be required a predetermined force exerted along said axis to expand the bearing so that it may receive the throw. Deformation of the bearing responsive to insertion of the crank throw will of course not stress the bearing in excess of its elastic limit. As the throw assumes its working position in the bearing, the latter is contracted by its resiliency and thus maintains said position. Dimensions of the parts are such that they may relatively pivot freely about their common axis when established in their illustrated working position.

In the modification shown in FIG. 2, the bearing 2a has a gap similar to that of FIG. 1 and has a resiliency affording an expansion of such gap as a crank throw 4a is forced into the bearing, the latter then contracting to maintain a working relation of the parts. The modification lies in forming the throw with a peripheral notch 5 accommodating one of the gap ends 3a during insertion of the throw in the bearing, as is illustrated in dash lines. By provision of such notch, it is feasible to reduce the circumferential extent of the gap and to thus materially increase retention of the throw in the bearing. Preferably the notch has an arcuate bottom, as shown, of a radius equal to that of the throw 4a, this reducing the requisite circumferential extent of the bearing gap and hence increasing retention of the throw in the bearing.

FIG. 3 shows a further modification, the bearing 2b having a gap as in FIG. 2 but said gap being centered in a radius considerably divergent to the axis of the rod rather than at such axis as in FIG. 2. The notch 5b in FIG. 3 has a chordal bottom and while such notch permits a certain reduction in the size of the gap, it is less effective for that purpose than the notch appearing in FIG. 2.

In FIG. 4, the bearing 2c terminally formed on a connecting rod 1c has a gap centered in the axis of said rod to afford insertion of the throw 4c. This modification increases the resilient play afforded the bearing by forming the bearing with a slot 6 bisecting the bearing and further extending axially along the adjoined end portion of the rod. Thus the slot forms furcations normally contracted as shown and possessing a slight resiliency which is added to that of the bearing to increase the possible expansion and contraction of the bearing. This will tend to reduce the requisite circumferential extent of the bearing gap and to hence increase retention of the throw 4c in the bearing. Preferably a bolt 7 transversely engages the rod and interconnects the furcations to prevent their undue divergency.

The described invention is applicable to piston type engines, pumps and compressors and to other mechanisms requiring a pivotal connection between driving and driven elements. While illustrated and described as pivotally joining a connecting rod to a crank shaft, it is evidently also applicable to operatively join a piston to such a rod.

What I claim is:

1. A connecting rod and pivot pin connection comprising a connecting rod terminally formed with an arcuate bearing and further comprising a substantially cylindrical pivot pin journaled in such bearing, the bearing having a circumferential gap predeterminedly less than the diameter of the pin and having a predetermined resiliency affording a circumferential expansion of the gap by the pin in laterally inserting the pin in the bearing, and a corresponding contraction of the bearing to conform to the pin diameter following such insertion, the gap being centered substantially in the extended longitudinal axis of the rod, the pin having a peripheral notch to facilitate inserting the pin in the bearing in a direction transverse to the pin, said notch having an arcuate bottom whereof the radius of curvature is at least approximately equal to the radius of the pin.

2. A connecting rod and pivot pin connection comprising a connecting rod terminally formed with an arcuate bearing and a substantially cylindrical pivot pin journaled in such bearing, the bearing having a circumferential gap predeterminedly less than the diameter of the pin and further having a predetermined resiliency affording a circumferential expansion of the gap by the pin in laterally inserting the pin in the bearing, and a corresponding contraction of the bearing to conform to the pin diameter following such insertion, the pin having a peripheral notch facilitating inserting the pin in the bearing in a direction transverse to the pin.

3. A connecting rod and pivot pin connection as set forth in claim 2, said notch having an arcuate bottom and the radius of curvature of such bottom being at least approximately equal to the radius of said pin.

(References on following page)

References Cited in the file of this patent

UNITED STATES PATENTS

| | | |
|---|---|---|
| 39,094 | Garlinghouse | June 30, 1863 |
| 1,643,720 | McKone | Sept. 27, 1927 |
| 2,095,516 | Albright | Oct. 12, 1937 |
| 2,604,364 | Ward | July 22, 1952 |
| 2,605,926 | Casey | Aug. 5, 1952 |
| 2,745,199 | Kreinberg | May 15, 1956 |

FOREIGN PATENTS

| | | |
|---|---|---|
| 316,694 | Switzerland | Dec. 15, 1956 |